(12) United States Patent
Ahn et al.

(10) Patent No.: US 8,966,936 B2
(45) Date of Patent: Mar. 3, 2015

(54) EXPANSION VALVE AND AIR CONDITIONER FOR VEHICLES HAVING THE SAME

(75) Inventors: Yongnam Ahn, Daejeon-si (KR); Jaehyeong Kim, Daejeon-si (KR); Byeonghak Min, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 393 days.

(21) Appl. No.: 12/942,505

(22) Filed: Nov. 9, 2010

(65) Prior Publication Data

US 2012/0036884 A1 Feb. 16, 2012

(30) Foreign Application Priority Data

Aug. 12, 2010 (KR) ........................ 10-2010-0077692

(51) Int. Cl.
- F25B 41/06 (2006.01)
- B60H 1/00 (2006.01)
- F25B 5/02 (2006.01)

(52) U.S. Cl.
CPC .......... *F25B 41/062* (2013.01); *B60H 1/00485* (2013.01); *F25B 5/02* (2013.01); *F25B 2341/0683* (2013.01)
USPC ............... 62/528; 62/527; 137/628; 137/869; 137/625.49

(58) Field of Classification Search
USPC ............ 62/527, 528, 524, 525; 137/628, 862, 137/869, 625.49
See application file for complete search history.

(56) References Cited

U.S. PATENT DOCUMENTS

| 2,714,897 A * | 8/1955 | Whitlock, Jr. ............ 137/119.08 |
| 2,983,286 A * | 5/1961 | Greenawalt et al. ...... 137/625.43 |
| 4,009,592 A * | 3/1977 | Boerger .......................... 62/222 |
| 6,758,055 B2 * | 7/2004 | Watanabe et al. ................ 62/225 |
| 7,373,788 B2 * | 5/2008 | Kobayashi et al. .............. 62/296 |
| 8,099,978 B2 | 1/2012 | Aung et al. |
| 2004/0112974 A1 * | 6/2004 | Law et al. .................... 236/92 B |
| 2007/0194140 A1 * | 8/2007 | Nestler et al. ............... 236/92 B |
| 2007/0209387 A1 | 9/2007 | Hirota |
| 2009/0038697 A1 * | 2/2009 | Cho et al. ................. 137/625.48 |
| 2009/0183520 A1 | 7/2009 | Yukimoto |

FOREIGN PATENT DOCUMENTS

| CN | 101033805 A | 9/2007 |
| JP | 61-038371 A | 2/1986 |
| JP | 61-091468 | 5/1986 |
| JP | 2000062452 A | 2/2000 |
| JP | 20000118231 A | 4/2000 |
| JP | 20001147050 A | 5/2001 |

(Continued)

*Primary Examiner* — Lakiya Rogers
*Assistant Examiner* — Orlando E Aviles Bosques
(74) *Attorney, Agent, or Firm* — Fulbright & Jaworski LLP

(57) ABSTRACT

An expansion valve and an air conditioner for vehicles having the same, the expansion valve comprising a main body having an inflow channel, first and second discharge channels and first and second orifices to expand refrigerant branched from the inflow channel to the first and second discharge channels; first and second valves to control flow rates of refrigerant passing through the first and second orifices by controlling the degree of opening of the first and second orifices respectively; and a shaft slidably mounted inside the main body for varying positions of the first and second valves simultaneously so that the first and second orifices are opened or closed at the same time by the movement of the shaft.

8 Claims, 15 Drawing Sheets

(56) References Cited

FOREIGN PATENT DOCUMENTS

| JP | 2009-085569 A | 4/2009 |
| JP | 2010038455 A * | 2/2010 |
| KR | 10 2007 008 2274 A | 8/2007 |
| KR | 2007082274 * | 8/2007 |

* cited by examiner

Prior Art

Prior Art

Prior Art

Closing first and second orifices

Opening first and second orifices ent invention relates to an expansion valve and an
EXPANSION VALVE AND AIR CONDITIONER FOR VEHICLES HAVING THE SAME

RELATED APPLICATIONS

This application claims priority from Korean Patent Application No. 10-2010-0077692 filed Aug. 12, 2010, which is incorporated herein by reference in its entirety for all purposes.

BACKGROUND OF THE INVENTION

1. Field of the Invention

The present invention relates to an expansion valve and an air conditioner for vehicles having the same, and more particularly, to an expansion valve, which can branch and expand refrigerant supplied from a condenser, discharge the branched and expanded refrigerant to an evaporator, and differently control the degree of opening of first and second orifices through first and second valves varied in their positions by a single shaft, and an air conditioner for vehicles having the expansion valve.

2. Background Art

In general, an air conditioner for vehicles is an auto part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

As shown in FIG. 1, a typical refrigeration cycle of the air conditioner includes a compressor 1 for compressing refrigerant, a condenser 2 for condensing the refrigerant of high pressure sent from the compressor 1, an expansion valve 3 for throttling the condensed and liquefied refrigerant, and an evaporator 4 for evaporating the liquid refrigerant of low pressure throttled through heat exchange with the air sent to the interior of the vehicle to thereby cool the air discharged to the interior of the vehicle due to the heat absorption effect by latent heat of the refrigerant, and the compressor 1, the condenser 2, the expansion valve 3 and the evaporator 4 are connected with one another in order via a refrigerant pipe 5. The interior of the vehicle is cooled through the following refrigerant circulation process.

When a cooling switch (not shown) of the air conditioner is turned on, the compressor 1 is first operated by engine power to thereby inhale and compress refrigerant gas of low temperature and low pressure and send the refrigerant gas to the condenser 2 in a high temperature and high pressure state, and then, the condenser 2 heat-exchanges the refrigerant gas with the outside air to thereby condense it into liquid refrigerant of high temperature and high pressure.

The liquid refrigerant of high temperature and high pressure sent from the condenser 2 is rapidly expanded by a throttling action of the expansion valve 3 and sent to the evaporator 4 in a saturated vapor state of low temperature and low pressure, and then, the evaporator 4 heat-exchanges the refrigerant received from the expansion valve 3 with the air blown to the interior of the vehicle by a blower (not shown)

Continuously, the refrigerant evaporated through heat-exchange with the outside air in the evaporator 4 is discharged in a gas phase of low temperature and low pressure and inhaled again into the compressor 1, and then, recirculated through the above-mentioned refrigeration cycle.

In the above refrigerant circulation process, cooling of the interior of the vehicle is achieved in such a way that the air blown by the blower (not shown) is cooled by the latent heat of the liquid refrigerant circulating in the evaporator 4 while passing through the evaporator 4 and discharged to the interior of the vehicle in a cooled state.

In the meanwhile, a receiver drier (not shown) for separating the refrigerant in a liquid phase from the refrigerant in a gas phase is mounted between the condenser 2 and the expansion valve 3 so as to supply only the refrigerant in the liquid phase to the expansion valve 3.

However, because the refrigeration cycle has a limit in improving the cooling efficiency, as shown in FIG. 2, a multiple-effect evaporation system for improving the cooling efficiency through multiple-effect evaporation has been developed.

The multiple-effect evaporation system shown in FIG. 2 includes two evaporators 4a and 4b arranged side by side, wherein refrigerant passing through one expansion valve 3 is branched and respectively supplied into the evaporators 4a and 4b.

Now, referring to FIG. 3, the expansion valve 3 will be described in brief. The expansion valve 3 includes: an orifice 34 formed between an inflow channel 32 and an outflow channel 33 on a lower portion thereof for expanding the refrigerant received from the condenser 2 and supplying it to the evaporators 4a and 4b; a main body 31 mounted on an upper portion thereof and having a connection channel 37 for supplying the refrigerant discharged from the evaporators 4a and 4b into the compressor 1; a valve 35 for controlling a flow rate of the refrigerant passing through the orifice 34; and a shaft 38 slidably moving by a diaphragm 36, which is varied in its position according to a temperature change of the refrigerant flowing inside the connection channel 37, to thereby move the valve 35.

Therefore, the first evaporator 4a located on an upstream side in an air flowing direction first cools the air, and then, the second evaporator 4b second cools the first cooled air, whereby the cooling efficiency is improved.

However, the multiple-effect evaporation system has a problem in that because the expansion valve 3 has just one orifice (expansion channel) 34, which equally branches the refrigerant expanded by and discharged from the expansion valve 3 and respectively supplies the branched refrigerant into the two evaporators 4a and 4b, it cannot differently control refrigerant flow rates of the refrigerant supplied to the two evaporators 4a and 4b.

That is, the first evaporator 4a located on the upstream side in the air flowing direction receives relatively less load than the second evaporator 4b because warm air is introduced into the first evaporator 4a, but the second evaporator 4b receives relatively more load than the first evaporator 4a because the air first cooled in the first evaporator 4a is introduced into the second evaporator 4b. Hence, there is a need to differently control the refrigerant flow rates supplied to the evaporators 4a and 4b according to load applied to the two evaporators 4a and 4b. However, the expansion valve 3 of the multiple-effect evaporation system shown in FIG. 2 cannot differently control refrigerant flow rates supplied to the two evaporators 4a and 4b.

Accordingly, the multiple-effect evaporation system having the expansion valve 3 according to the prior art still has a limit in improving the cooling efficiency.

Meanwhile, as shown in FIG. 4, another evaporation system having two evaporators 4a and 4b and two expansion valves 3a and 3b for differently controlling refrigerant flow rates toward the evaporators 4a and 4b is disclosed. But, such an evaporation system also has several problems in that it needs a wide space, has a complicated structure, and increases manufacturing expenses due to an increase of the number of components because the two expansion valves 3a and 3b are mounted therein.

SUMMARY OF THE INVENTION

Accordingly, the present invention has been made to solve the above-mentioned problems occurring in the prior arts, and it is an object of the present invention to provide an expansion valve and an air conditioner for vehicles having an expansion valve, which can branch and expand refrigerant supplied from a condenser, discharge the branched and expanded refrigerant to an evaporator, and differently control the degree of opening of first and second orifices through first and second valves varied in their positions by a single shaft, thereby simultaneously supplying different flow rates of refrigerant, which is expanded while passing through the first and second orifices, to each of evaporation parts of the evaporator, enhancing cool efficiency of the air conditioner, and reducing the number of components and manufacturing expenses since just one expansion valve is used.

To accomplish the above object, according to the present invention, there is provided an expansion valve comprising: a main body having an inflow channel receiving refrigerant from the condenser, first and second discharge channels for branching the refrigerant supplied to the inflow channel and discharging it into the evaporator, and first and second orifices for connecting the inflow channel and the first discharge channel with each other and connecting the inflow channel and the second discharge channel with each other so as to expand the refrigerant branched from the inflow channel to the first and second discharge channels; first and second valves mounted inside the main body and constructed to control flow rates of refrigerant passing through the first and second orifices by controlling the degree of opening of the first and second orifices; and a shaft slidably mounted inside the main body for varying positions of the first and second valves, wherein one of the first and second discharge channels is formed on an upper portion of the inflow channel and the other is formed on a lower portion of the inflow channel along an axial direction of the shaft.

Furthermore, there is provided an air conditioner for vehicles comprising: a compressor for inhaling and compressing refrigerant; a condenser for condensing refrigerant compressed in the compressor; an expansion valve written in one of claims 1 to 16 and constructed for branching and expanding refrigerant discharged from the condenser; and an evaporator having a plurality of evaporation parts for receiving and evaporating the refrigerant branched and discharged from the expansion valve and sending the refrigerant into the compressor, wherein the evaporation parts are overlappedly arranged in an air flowing direction, so that the air blown by a single blower can pass through the evaporation parts in order, wherein the degree of opening of the first and second orifices is controlled through the first and second valves varied in their positions by the shaft of the expansion valve so as to make refrigerant flow rates, which are respectively supplied to the evaporation parts, different from each other.

The expansion valve according to the present invention includes the first and second orifices branched from the inflow channel inside the expansion valve for branching refrigerant supplied from the condenser and supplying the branched refrigerant into the first and second evaporation parts of the evaporator, the first and second discharge channels, and the first and second valves varied in their positions by the single shaft, wherein the first and second valves or the first and second orifices have different shapes or sizes from each other in order to differently control the degree of opening of the first and second orifices by the first and second valves, thereby simultaneously supplying different flow rates of refrigerant, which is expanded while passing through the first and second orifices, to the first and second evaporation parts of the evaporator, enhancing cool efficiency of the air conditioner.

Moreover, because the refrigerant is branched by the one expansion valve, the present invention can reduce the number of components and manufacturing expenses.

Furthermore, the first and second discharge channels are formed on the upper and lower portion of the inflow channel and the first and second orifices are arranged along the axial direction of the shaft, thereby reducing lengths of the first and second orifices and lengths of the first and second discharge channels formed in the expansion valve and also reducing the size of the expansion valve due to the reduction of the lengths of the first and second orifices and the first and second discharge channels.

Additionally, the orifice member in which the second orifice is formed can be detachably joined to the inside of the main body of the expansion valve, thereby easily changing the rate of refrigerant branched into the first and second discharge channels by changing the size of the second orifice of the orifice member.

In addition, another discharge channel is additionally formed at a dead zone (between the connection channel and the inflow channel for passing the refrigerant discharged from the evaporator) of the existing expansion valve, thereby minimizing an increase of size of the expansion valve even though the discharge channel is added.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
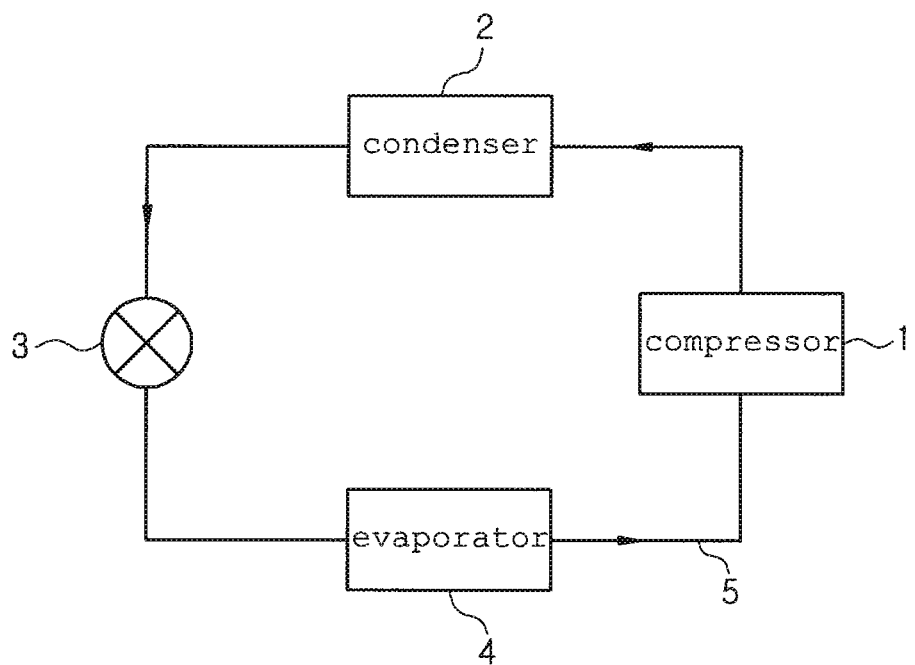
FIG. 1 is a configurative view of a refrigeration cycle in a general air conditioner for vehicles.
Figure 2:
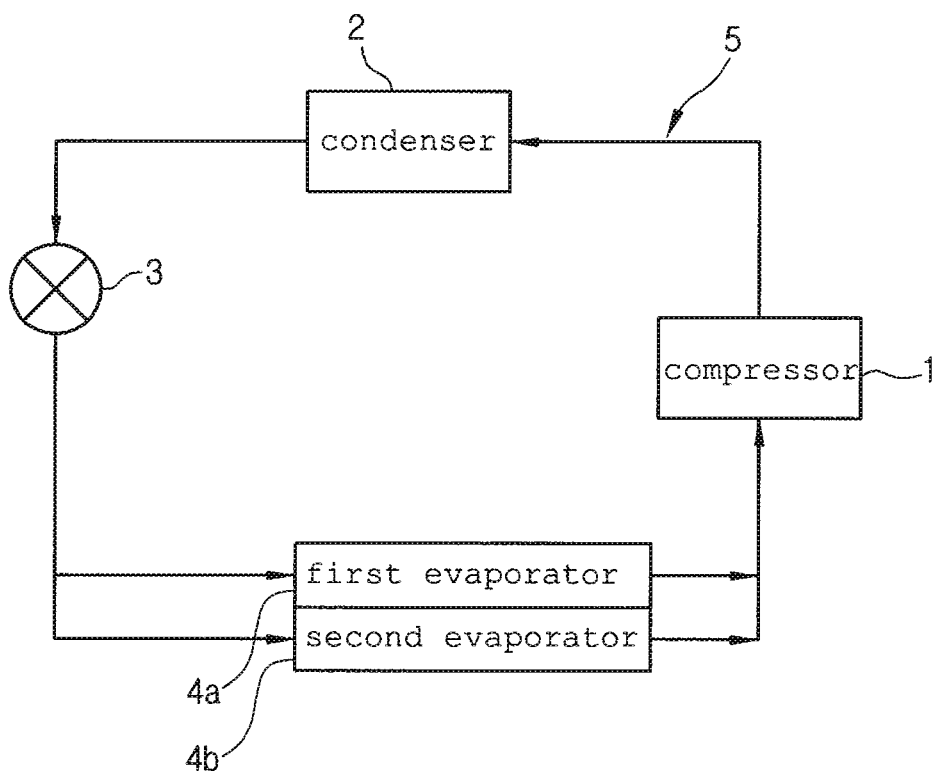
FIG. 2 is a configurative view of a multiple-effect evaporation system according to a prior art.
Figure 3:
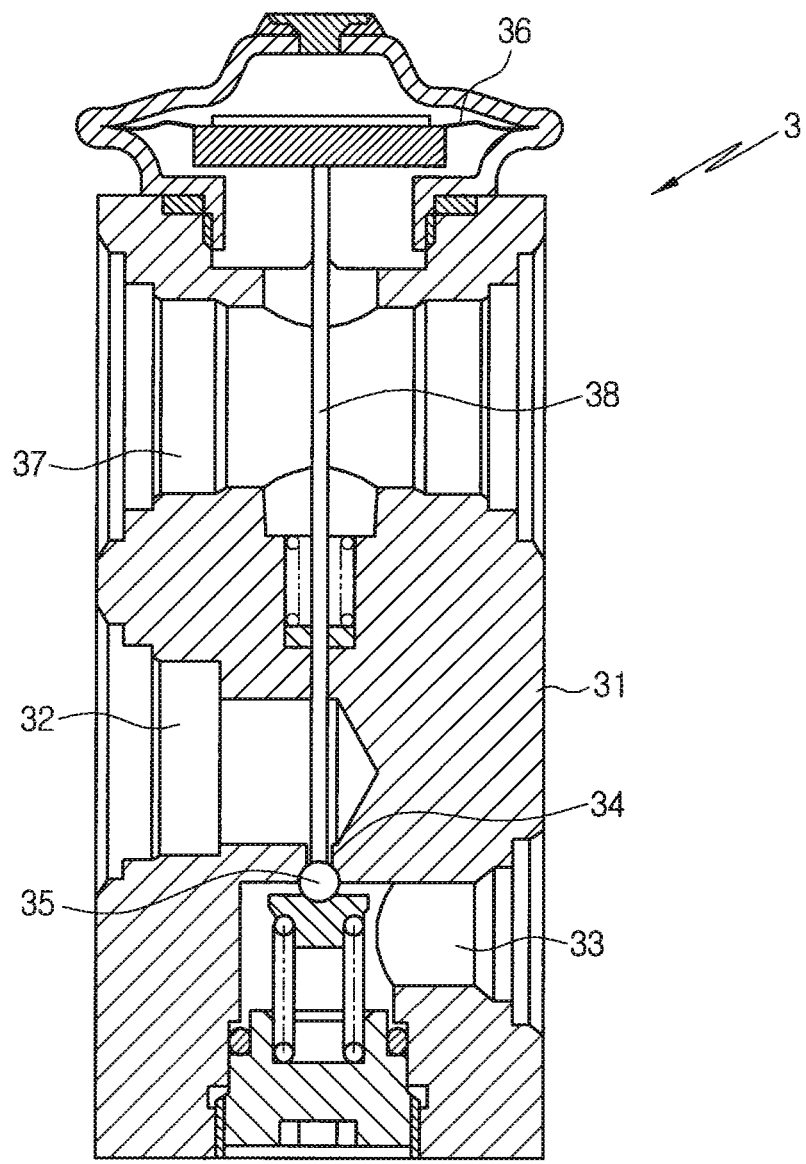
FIG. 3 is a sectional view of an expansion valve in FIG. 2.
Figure 4:
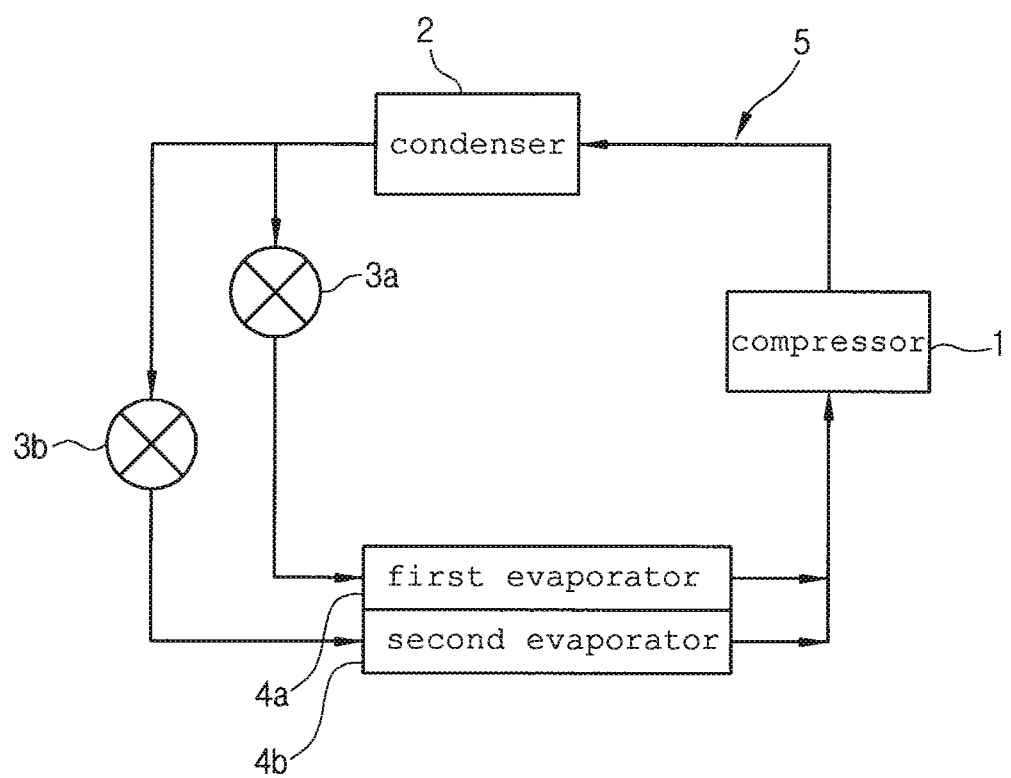
FIG. 4 is a configurative view of a multiple-effect evaporation system according to another prior art.
Figure 5:
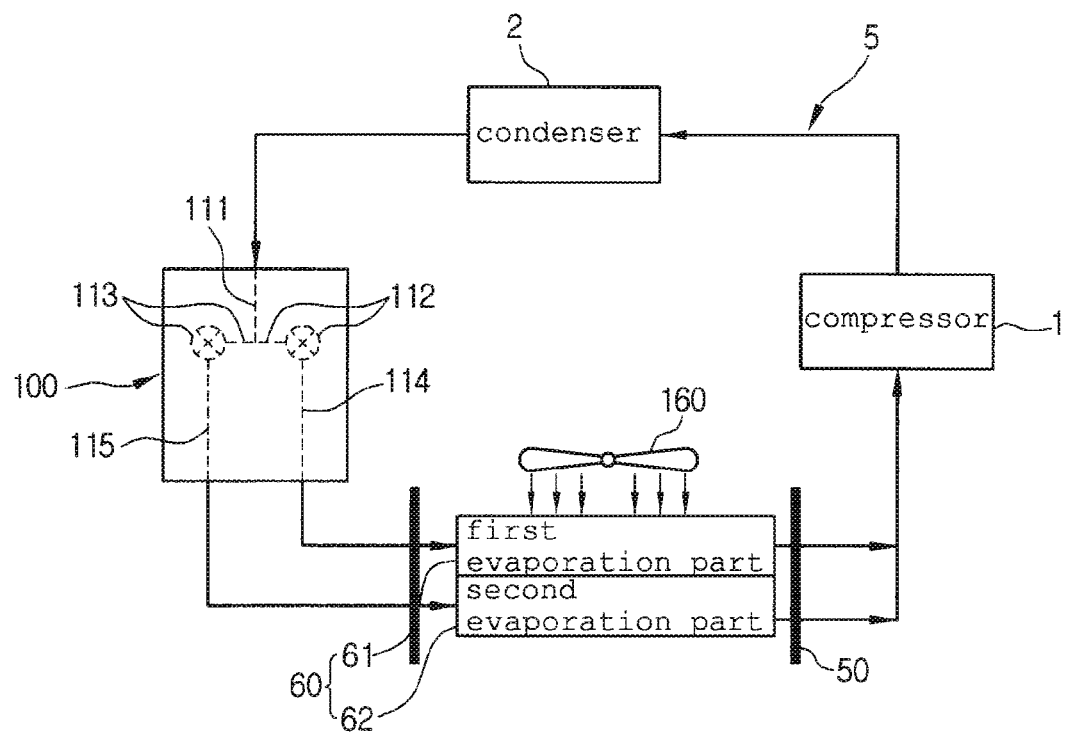
FIG. 5 is a configurative view, in brief, of a refrigeration cycle of an air conditioner for vehicles.
Figure 6:
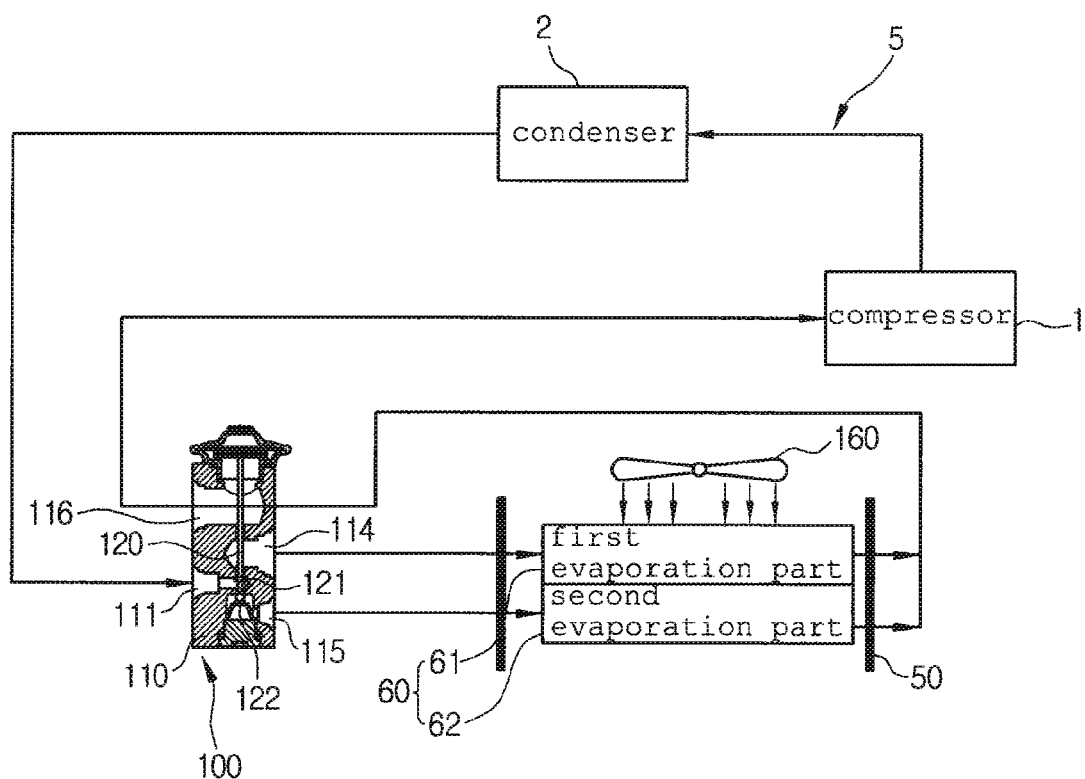
FIG. 6 is a configurative view of the air conditioner.

Reference will be now made in detail to the preferred embodiment of the present invention with reference to the attached drawings.

First, an air conditioner for vehicles, to which an expansion valve 100 according to the present invention is applied, has a refrigeration cycle including a compressor 1, a condenser 2, the expansion valve 100, and an evaporator 60, which are connected with one another in order via a refrigerant pipe 5, wherein a single expansion valve 100 is mounted and the evaporator 60 is divided into two evaporation areas, namely, a first evaporation part 61 and a second evaporation part 62.

The compressor 1 is operated by receiving driving power from a power supply (an engine, a motor, or others) to thereby inhale and compress refrigerant in a gas phase discharged from the evaporator 60 and discharge the refrigerant in the gas phase of high temperature and high pressure to the condenser 2.

The condenser 2 heat-exchanges the gas refrigerant of high temperature and high pressure discharged from the compressor 1 with the outside air, condenses it into a liquid phase of high temperature and high pressure, and then, discharges the condensed refrigerant to the expansion valve 100.

The expansion valve 100 includes a main body 110 and two orifices (expansion channels) 112 and 113 formed inside the main body 110. Therefore, refrigerant in the liquid phase of high temperature and high pressure discharged from the condenser 2 is introduced into the main body 110 and expanded while passing through the two orifices 112 and 113, and then, turned into a saturated vapor phase of low temperature and low pressure. After that, the branched refrigerant is respectively supplied to the first evaporation part 61 and the second evaporation part 62 of the evaporator 60.

The expansion valve 100 controls the degree of opening of the first and second orifices 112 and 113 through first and second valves 121 and 122 varied in their positions by a shaft 120, so that it can make refrigerant flow rates supplied to the evaporation parts 61 and 62 different from each other.

In this instance, because air blown by a single blower 160 passes through the first and second evaporation parts 61 and 62 in order, it is preferable that the refrigerant flow rate supplied to the evaporation part 61 mounted on an upstream side of the expansion valve 100 in the air flowing direction is greater than the refrigerant flow rate supplied to the evaporation part 62 mounted on a downstream side.

The expansion valve 100 will be described in more detail later.

In the meantime, a receiver drier (not shown) for separating the refrigerant in the liquid phase from the refrigerant in the gas phase is mounted between the condenser 2 and the expansion valve 100 so as to supply only the refrigerant in the liquid phase to the expansion valve 100.

The evaporator 60 receives the liquid refrigerant of low pressure expanded and branched while passing through the two orifices (expansion channels) 112 and 113 in the expansion valve 100, and heat-exchanges the liquid refrigerant with the air blown to the interior of the vehicle by the blower 160 to evaporate the liquid refrigerant, thereby cooling the air discharged to the interior of the vehicle due to the heat absorption effect by latent heat of the refrigerant.

The evaporator 60 includes the first evaporation part 61 for evaporating the refrigerant expanded in the first orifice 112 and the second evaporation part 62 for evaporating the refrigerant expanded in the second orifice 113.

That is, the single evaporator, 60 is divided into two evaporation parts: the first evaporation part 61; and the second evaporation part 62.

Of course, two separate evaporators may be mounted in the place of the first evaporation part 61 and the second evaporation part 62 of the single evaporator 60.

Moreover, the first evaporation part 61 and the second evaporation part 62 are arranged in such a way as to overlap each other in the movement direction of the air passing through the first and second evaporation parts 61 and 62, so that the air blown by the blower 160 is cooled while passing through the first and second evaporation parts 61 and 62 in order.

In the meantime, the first evaporation part 61 is connected with a first discharge channel 114 of the first orifice 112 via the refrigerant pipe 5, and the second evaporation part 62 is connected with a second discharge channel 115 of the second orifice 113 via the refrigerant pipe 5.

Furthermore, the expansion valve 100 according to the present invention includes the main body 110, the first and second valves 121 and 122, the shaft 120, and operating means 130.

The main body 110 includes an inflow channel 111 receiving refrigerant from the condenser 2, the first and second discharge channels 114 and 115 for discharging the refrigerant, which is supplied to the inflow channel 111, into the first evaporation part 61 and the second evaporation part 62, and the first and second orifices 112 and 113 constructed for connecting the inflow channel 111 and the first discharge channel 114 with each other and for connecting the inflow channel 111 and the second discharge channel 115 with each other so as to expand the refrigerant branched from the inflow channel 111 to the first and second discharge channels 114 and 115.

Diameters of the first and second orifices 112 and 113 are smaller than those of the inflow channel 11 and the first and second discharge channels 114 and 115.

Accordingly, the refrigerant supplied from the condenser 2 into the inflow channel 111 is expanded in the process of being branched into the first and second discharge channels 114 and 115 while passing through the first and second orifices 112 and 113.

In this instance, it is preferable that the diameter of the second orifice 113 is smaller than outer diameters of the first and second valves 121 and 122.

Moreover, one of the first and second discharge channels 114 and 115 is formed on an upper portion of the inflow channel 111 and the other is formed on a lower portion of the inflow channel 111 along an axial direction of the shaft 120.

In this instance, an end portion of the inflow channel 111 and end portions of the first and second discharge channels 114 and 115, which are opposite to each other, are overlapped in the axial direction of the shaft 120.

In other words, the lower portion of the main body 110 has a structure that the second discharge channel 115, the inflow channel 111 and the first discharge channel 114 are stacked on one another in order in a state where they are spaced apart from one another at a predetermined interval, wherein end portions of the channels facing each other are overlapped with one another and the first and second orifices 112 and 113 are formed on the overlapped portions, so that the refrigerant introduced into the inflow channel 111 is branched into the first and second discharge channels 114 and 115.

Additionally, the first and second orifices 112 and 113 are formed on upper and lower portions of the inflow channel 111 along the axial direction of the shaft 120, and then, connected with the first and second discharge channels 114 and 115.

Meanwhile, the inflow channel 111 is connected with an outlet side of the condenser 211 via the refrigerant pipe 5, the first discharge channel 114 is connected with the first evaporation part 61 of the evaporator 60 via the refrigerant pipe 5, and the second discharge channel 115 is connected with the second evaporation part 62 of the evaporator 60 via the refrigerant pipe 5.

The main body 110 further includes a connection channel 116 for supplying the refrigerant discharged from the evaporator 60 to the compressor 1.

One side of the connection channel 116 is connected with an outlet side of the evaporator 60 via the refrigerant pipe 5, and the other side is connected with an inlet side of the compressor 1 via the refrigerant pipe 5.

Therefore, the refrigerant discharged from the evaporator 60 is supplied to the compressor 1 after passing through the connection channel 116 of the main body 110.

In the meantime, as shown in the drawings, the connection channel 116 may be configured to form an angle of 90 degrees between an inlet and an outlet thereof, but may be configured to form an angle of 180 degrees. Additionally, the inflow channel 11 and the first and second discharge channels 114 and 115 may be formed at an angle of 180 degrees or at an angle of 90 degrees.

Moreover, the first and second valves 121 and 122 are mounted inside the main body 110 and control the degree of opening of the first and second orifices 112 and 113 to thereby control the refrigerant flow rates passing through the first and second orifices 112 and 113.

Here, one of the first and second valves 121 and 122 is mounted at a position to open and close an inlet 112a of the first orifice 112, and the other is mounted at a position to open and close an outlet 113a of the second orifice 113.

In the drawings, the first valve 121 is mounted beneath the inlet 112a of the first orifice 112 inside the inflow channel 111 to thereby control the degree of opening of the first orifice 112, and the second valve 122 is mounted beneath the outlet 113a of the second orifice 113 inside the second discharge channel 115 to thereby control the degree of opening of the second orifice 113.

Furthermore, the first orifice 112 having the inlet 112a opened and closed by the first valve 121 is arranged on the upper portion along the axial direction of the shaft 120, and the second orifice 113 having the outlet 113a opened and closed by the second valve 122 is arranged on the lower portion along the axial direction of the shaft 120.

As described above, the first valve 121 is configured to open and close the inlet 112a of the first orifice 112 and the second valve 122 is configured to open and close the outlet 113a of the second orifice 113, whereby the first and second valves 121 and 122 varied in their positions by the shaft 120 can carry out opening and closing actions.

If the first and second valves 121 and 122 are all mounted at a position where only one of the inlet and the outlet of the first and second orifices 112 and 113 is opened and closed, it is not easy to smoothly operate the first and second valves 121 and 122 by actuating the shaft 120 in the axial direction and it makes the structure of the expansion valve be complicated since two shafts are needed.

Additionally, the single shaft 120 is slidably mounted inside the main body 110 and varies the positions of the first and second valves 121 and 122.

The shaft 120 is movably mounted inside the main body 110 in a vertical direction, and its lower end portion penetrates the centers of the first and second orifices 112 and 113. Thereby, the first and second orifices 112 and 113 are formed concentrically with the shaft 120 mounted vertically.

The upper end portion of the shaft 120 is connected with the operating means 130 mounted on the top of the main body 110.

Meanwhile, the shaft 120, which is vertically mounted inside the main body 110, penetrates the connection channel 116, the first discharge channel 114, the first orifice 112, the inflow channel 111, and the second orifice 113.

Additionally, the connection channel 116, the inflow channel 111, and the first and second discharge channels 114 and 115 are formed at right angles to the shaft 120.

The operating means 130, which is mounted on the top of the main body 110, is varied in its position while expanding and contracting according to temperature of refrigerant discharged from the evaporator 60, thereby moving the shaft 120.

In more detail, the operating means 130 includes a thermosensitive chamber 131 filled with fluid expanding and contracting according to a temperature change of refrigerant, which is discharged from the evaporator 60 and flows through the connection channel 116, and a diaphragm 132 vertically changing its position according to the expansion and contraction of the fluid contained in the thermosensitive chamber 131 to thereby reciprocally move the shaft 120.

In the meantime, as another implementation of the operating means 130, an electrically operating solenoid (not shown) may be mounted on the top of the main body 110. That is, the solenoid reciprocally moves the shaft 120 by electric current applied.

As described above, the first and second valves 121 and 122 are varied in their positions by the shaft 120 moving to a predetermined distance by means of the operating means 130 according to the state (pressure or temperature) of the evaporator 60 to thereby control the degree of opening of the first and second orifices 112 and 113, whereby the flow rate of refrigerant, which is branched through the first and second discharge channels 114 and 115 and supplied to the first evaporation part 61 and the second evaporation part 62, can be controlled.

Moreover, the first and second valves 121 and 122 may be formed integrally with the shaft 120 in a state where they are spaced apart from each other at a predetermined interval. Alternatively, only the first valve 121 is formed integrally with the shaft 120 but the second valve 122 is formed separately from the shaft 120.

In case that the first and second valves 121 and 122 are formed integrally with the shaft 120, the second valve 122 for controlling the degree of opening of the second orifice 113 is formed integrally with the end portion of the shaft 120, and the first valve 121 for controlling the degree of opening of the first orifice 112 is formed integrally with the shaft 120 in a state where it is spaced apart from the second valve 122 at a predetermined interval.

In the meantime, in case that only the first valve 121 is formed integrally with the shaft 120 but the second valve 122 is formed separately from the shaft 120, the second valve 122 is in contact with the end portion of the shaft 120 and movably mounted inside the second discharge channel 115 of the main body 110 to thereby control the degree of opening of the second orifice 113.

Furthermore, even though the second valve 122 is mounted separately from the end portion of the shaft 120, it provides the same effect as that the second valve 122 is formed integrally with the end portion of the shaft 120.

Moreover, the second valve 122 is elastically supported toward the shaft 120 by an elastic member 141 mounted inside the second discharge channel 115.

In this instance, a mounting hole 117, to which the elastic member 141 will be mounted, is formed on the lower end portion of the main body 110 in such a way as to communicate with the second discharge channel 115. The mounting hole 117 is formed concentrically with the shaft 120.

Additionally, the mounting hole 117 is sealed by a sealing member 140.

Meanwhile, the mounting hole 117 is formed on the lower end portion of the main body 110 in the axial direction of the shaft 120 by virtue of drilling, and in this instance, a connection passageway 118 is also formed on the lower end portion of the main body 110 and an orifice member 150, which will be described later, is joined thereto.

Here, the elastic member 141 is seated and mounted on the top of the sealing member 140, and a support member 142 is disposed between the elastic member 141 and the second valve 122 for stably supporting the second valve 122.

Moreover, in the present invention, the refrigerant supplied from the condenser 2 to the inflow channel 111 is branched into the first and second discharge channels 114 and 115 while being expanded through the first and second orifices 112 and 113 and, and then, supplied to the first and second evaporation parts 61 and 62 of the evaporator 60. In this instance, the first and second valves 121 and 122 or the first and second orifices 112 and 113 have different shapes from each other, so that different refrigerant flow rates are branched and supplied into the first and second valves 121 and 122 through the first and second orifices 112 and 113.

That is, because the first evaporation part 61, which is located at the upstream side in the movement direction of the air blown by the blower 160 inside an air-conditioning case 50, receives warm air, relatively more load is applied to the first evaporation part 61. However, because the second evaporation part 62, which is located at the downstream side, receives the air first cooled in the first evaporation part 61, relatively less load is applied to the second evaporation part 62. As described above, cooling efficiency can be enhanced when the relatively more refrigerant flow rate is supplied to the first evaporation part 61, to which more load is applied, and the relatively less refrigerant flow rate is supplied to the second evaporation part 62, to which less load is applied.

As described above, different refrigerant flow rates are respectively supplied to the first and second evaporation parts 61 and 62 according to the load applied to the first and second evaporation parts 61 and 62 using the single expansion valve 100, whereby cooling efficiency of the air conditioner can be enhanced and the number of components and manufacturing expenses can be reduced.

FIGS. 11 to 15 illustrate various implementations of different shapes of the first and second valves 121 and 122.

Figure 11:
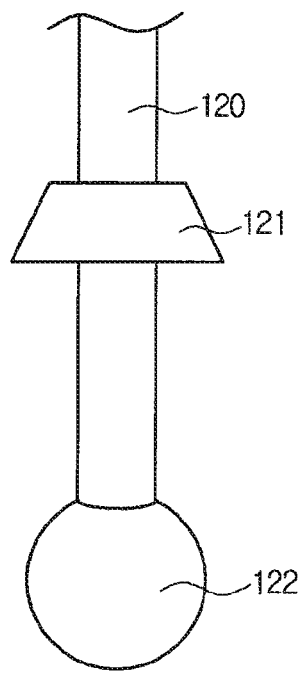
FIGS. 11 to 15 are views of various implementations of first and second valves of the expansion valve.
Figure 12:
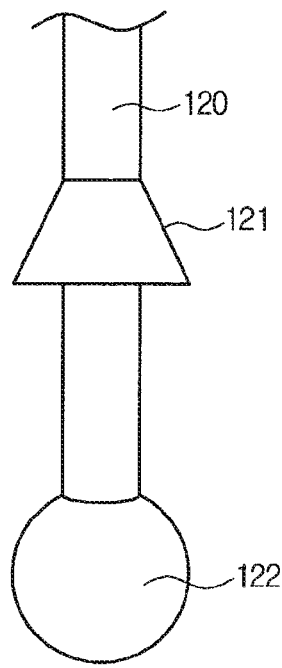

In FIG. 11, one of the first and second valves 121 and 122 may be formed in a ball shape and the other may be formed in a truncated cone shape. In the drawing, the first valve 121 is formed in the truncated cone and the second valve 122 is formed in the ball shape. Here, the truncated cone is formed integrally with the shaft 120 as shown in FIG. 11 or FIG. 12.

Figure 13:
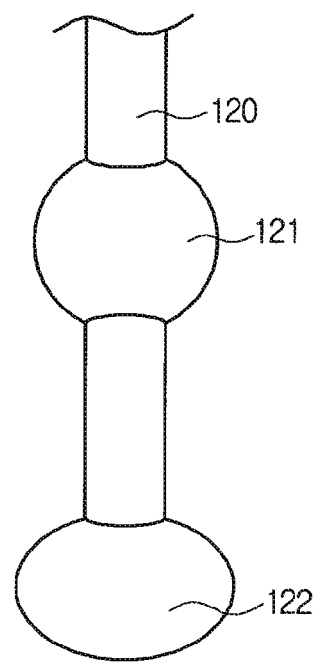

In FIG. 13, one of the first and second valves 121 and 122 may be formed in a ball shape and the other may be formed in an oval shape. In the drawing, the first valve 121 is formed in the ball shape and the second valve 122 is formed in the oval shape.

Figure 14:
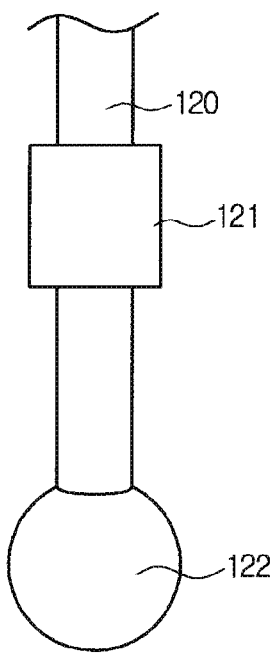

In FIG. 14, one of the first and second valves 121 and 122 may be formed in a ball shape and the other may be formed in a cylindrical shape. In the drawing, the first valve 121 is formed in the cylindrical shape and the second valve 122 is formed in the ball shape.

Moreover, in the above description, the first and second valves 121 and 122 have different shapes from each other, but they may be formed in the same shape but in different sizes from each other.

Figure 15:
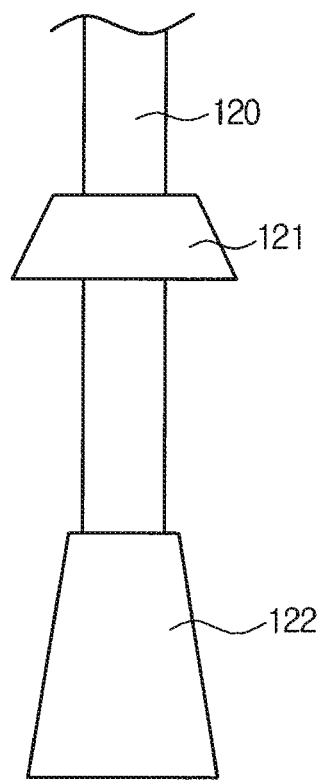

For an instance, in FIG. 15, all of the first and second valves 121 and 122 are formed in the truncated cone shape, but the second valve 122 is relatively taller than the first valve 121.

Besides the above, all of the first and second valves 121 and 122 are formed in the ball shape. Also, in this instance, it is preferable that even though the first and second valves 121 and 122 have the same shape, they take different sizes from each other. Of course, in case that all of the first and second valves 121 and 122 take the same shape and size, it is preferable that the first and second orifices 112 and 113 have different shapes or different sizes from each other.

In the meantime, not shown in the drawings, but one of the first and second valves 121 and 122 may be formed in a polyhedron.

As described above, because the first and second valves 121 and 122 take different shapes or sizes from each other, different refrigerant flow rates can be supplied through the first and second orifices 112 and 113.

Moreover, in order to supply different refrigerant flow rates through the first and second orifices 112 and 113, in addition to the above method that the first and second valves 121 and 122 have different shapes or sizes from each other, there is another method that the first and second orifices 112 and 113 have different shapes or sizes from each other.

Figure 9:
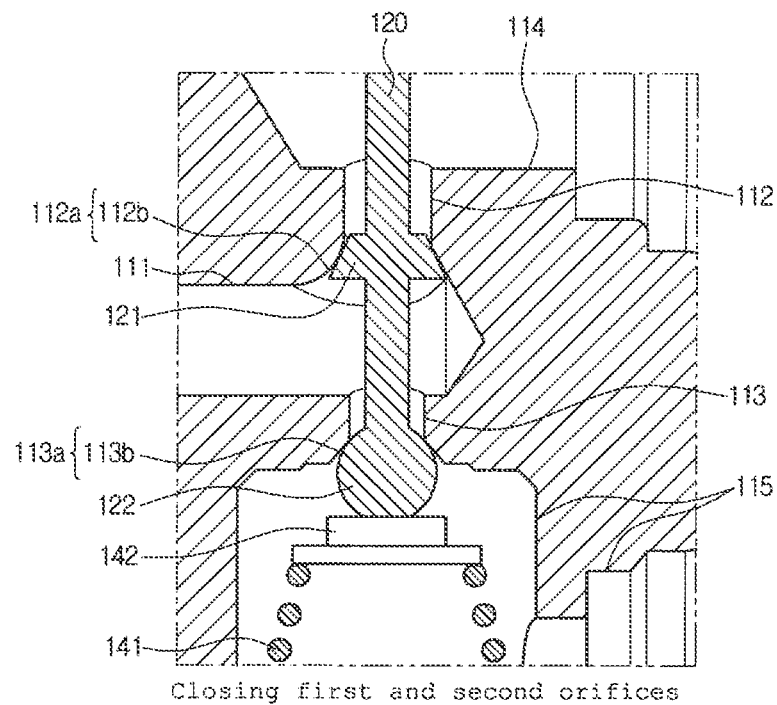
FIG. 9 is a partially sectional view showing a state where first and second orifices are closed and opened in the expansion valve.
Figure 9:
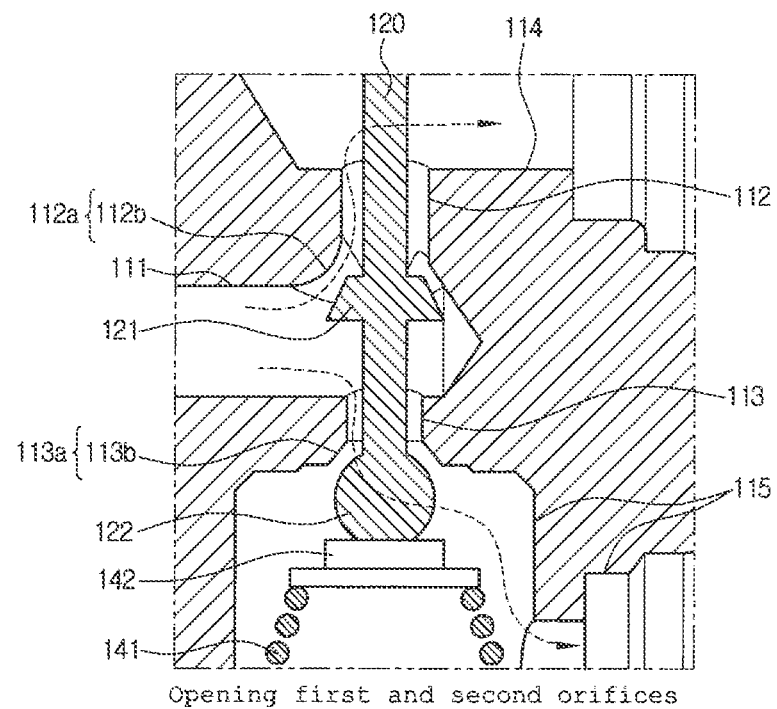
Figure 10:
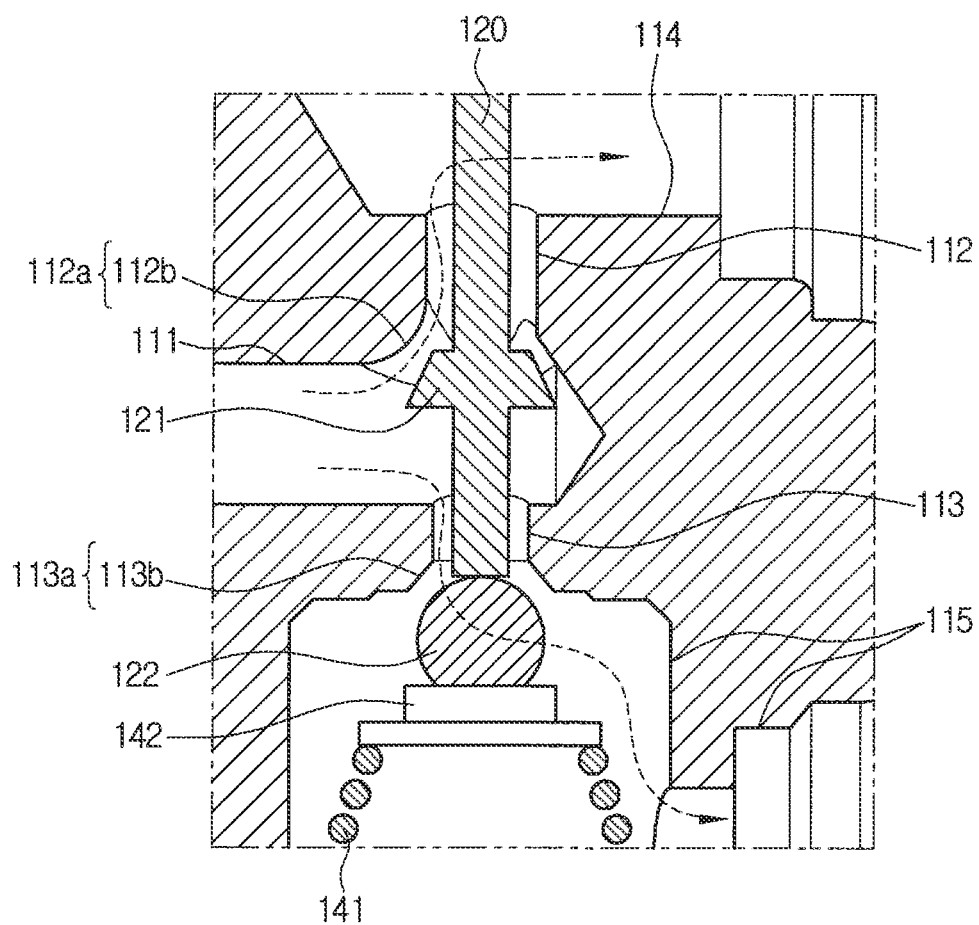
FIG. 10 is a partially sectional view showing a state where a second valve of the expansion valve is separated from a shaft.

That is, as shown in FIG. 9, the first and second orifices 112 and 113 have different diameters from each other, or the first orifice 112 has a seating face 112b formed on the inlet 112a thereof so that the first valve 121 is seated thereon and the second orifice 113 has another seating face 113b formed on the outlet 113a thereof so that the second valve 122 is seated thereon. In this instance, the seating face 112b of the inlet 112a of the first orifice 112 is different in shape from the seating face 113b of the outlet 113a of the second orifice 113.

In this instance, the refrigerant flow rate is controlled according to a distance between the seating faces 112b and 113b of the first and second orifices 112 and 113 and the first and second valves 121 and 122.

Moreover, it is preferable that one of the seating faces 112b and 113b of the first and second orifices 112 and 113 is in a curved form and the other is in an inclined form. In the drawings, the seating face 112b of the inlet 112a of the first orifice 112 is formed in the curved form and the seating face 113b of the outlet 113a of the second orifice 113 is in the inclined form.

Furthermore, the seating faces 112b and 113b of the first and second orifices 112 and 113 may be different in area, angle, depth, diameter, and so on from each other, and additionally, in case that the seating faces 112b and 113b of the first and second orifices 112 and 113 have the same shape, they are different in size from each other.

As described above, because the first and second valves 121 and 122 have different shapes or sizes from each other or the first and second orifices 112 and 113 have different shapes or sizes from each other, when the shaft 120 moves a predetermined distance, the first and second valves 121 and 122 are respectively spaced apart from the seating faces 112b and 113b of the first and second orifices 112 and 113 at different distances from each other, so that refrigerant passes through the first and second orifices 112 and 113 at different flow rates, whereby different refrigerant flow rates can be supplied to the first evaporation part 61 and the second evaporation part 62.

Figure 16:
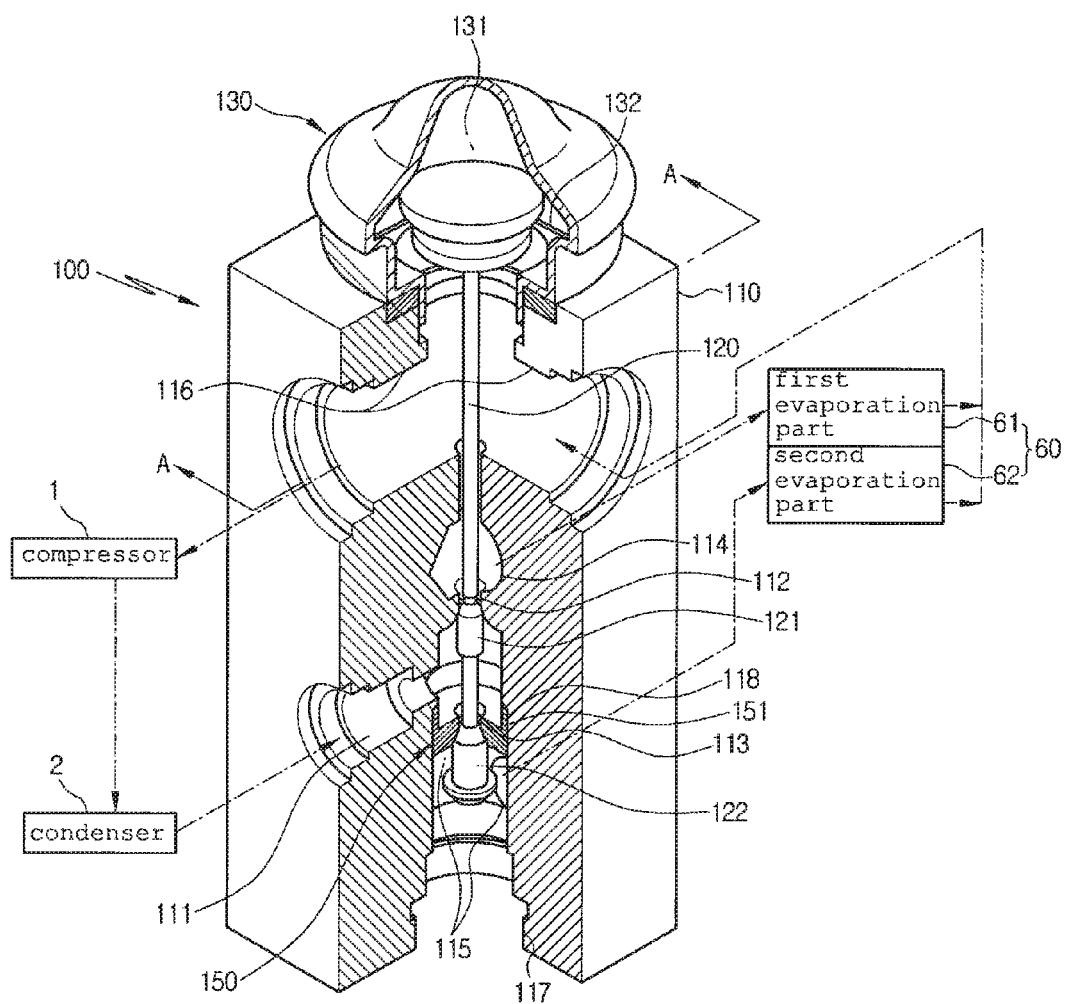
FIG. 16 is a sectional perspective view showing a state where a second orifice is formed on an orifice member detachably joined to a main body of the expansion valve.
Figure 17:
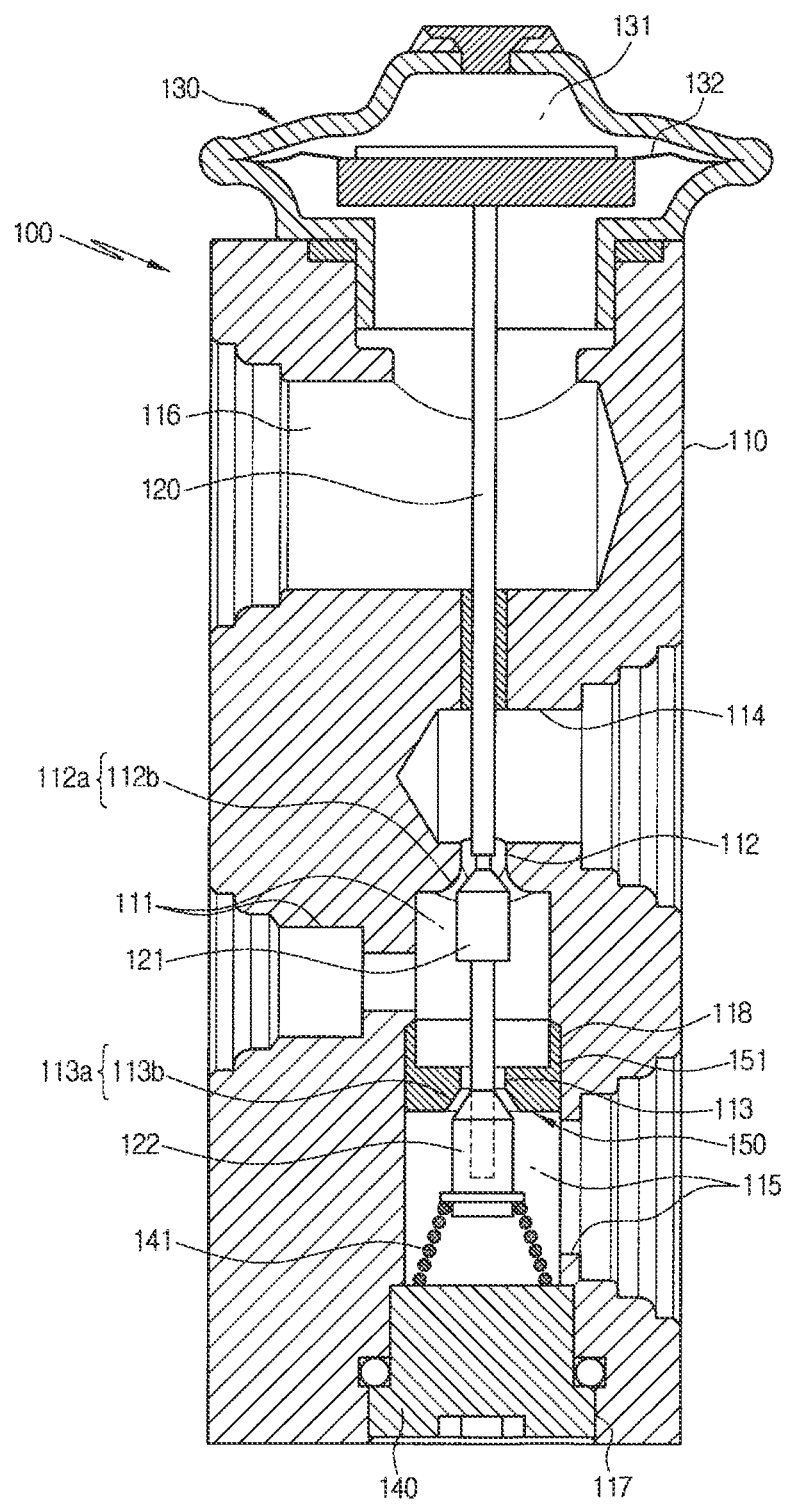
FIG. 17 is a sectional view of FIG. 16.

Additionally, referring to FIGS. 16 and 17, the second orifice 113 is mounted on the lower portion along the axial direction of the shaft 120 by virtue of the orifice member 150 detachably joined inside the main body 10.

The orifice member 150 includes a joining body 151 detachably joined to the connection passageway 118 formed for connecting the inflow channel 111 and the second discharge channel 115 with each other, and the second orifice 113 formed on the inner circumferential surface of the joining body 151.

That is, the connection passageway 118 for connecting the inflow channel 111 and the second discharge channel 115 with each other is formed in the axial direction of the shaft 120 in the lower end portion of the main body 110 by drilling, and the orifice member 150 is detachably joined to the inner circumferential surface of the connection passageway 118.

It is the reason that the second orifice 113 is formed on the orifice member 150 detachably mounted on the main body 110. The shaft 120 is assembled upwardly from the lower portion of the main body 110, and in this instance, because the first valve 121 formed on the shaft 120 can be located at the inlet 112a of the first orifice 112 only after it passes through the second orifice 113, the shaft 120 can be assembled when the second orifice 113 is mounted on the orifice member 150 detachably mounted on the main body 110.

Moreover, because the first valve 121 is formed integrally with the shaft 120 and the second valve 122 is formed separately from the first valve 121 and the shaft 120, the second valve 122 is joined to the end portion of the shaft 120 after the orifice member 150 is first joined to the connection passageway 118 of the main body 110.

That is, as shown in the drawings, in order to locate the orifice member 150 between the first and second valves 121 and 122, it is preferable that the second valve 122 is formed separately from the first valve 121 and the shaft 120.

Accordingly, the assembling process is as follows. First, the shaft 120 is assembled to the main body 110, the first valve 121 is located at a fixed position inside the main body 110, and then, the orifice member 150 on which the second orifice 113 is formed is inserted and joined into the connection passageway 118 of, the main body 110. After that, the second valve 122 formed separately is joined to the end portion of the shaft 120.

Here, the second valve 122 is forcedly joined to the end portion of the shaft 120.

Furthermore, it is preferable that an outer diameter of the joining body 151 of the orifice member 150 is equal to or larger than that of the first valve 121.

In other words, the outer diameter of the first valve 121 must be equal to or smaller than an inner diameter of the connection passageway 118 (the outer diameter of the joining body 151 of the orifice member 150), on which the orifice member 150 will be seated, so that the shaft 120 can be easily assembled upwardly from the lower portion of the main body 110.

In addition, the first and second discharge channels 114 and 115 have the same diameter.

Figure 7:
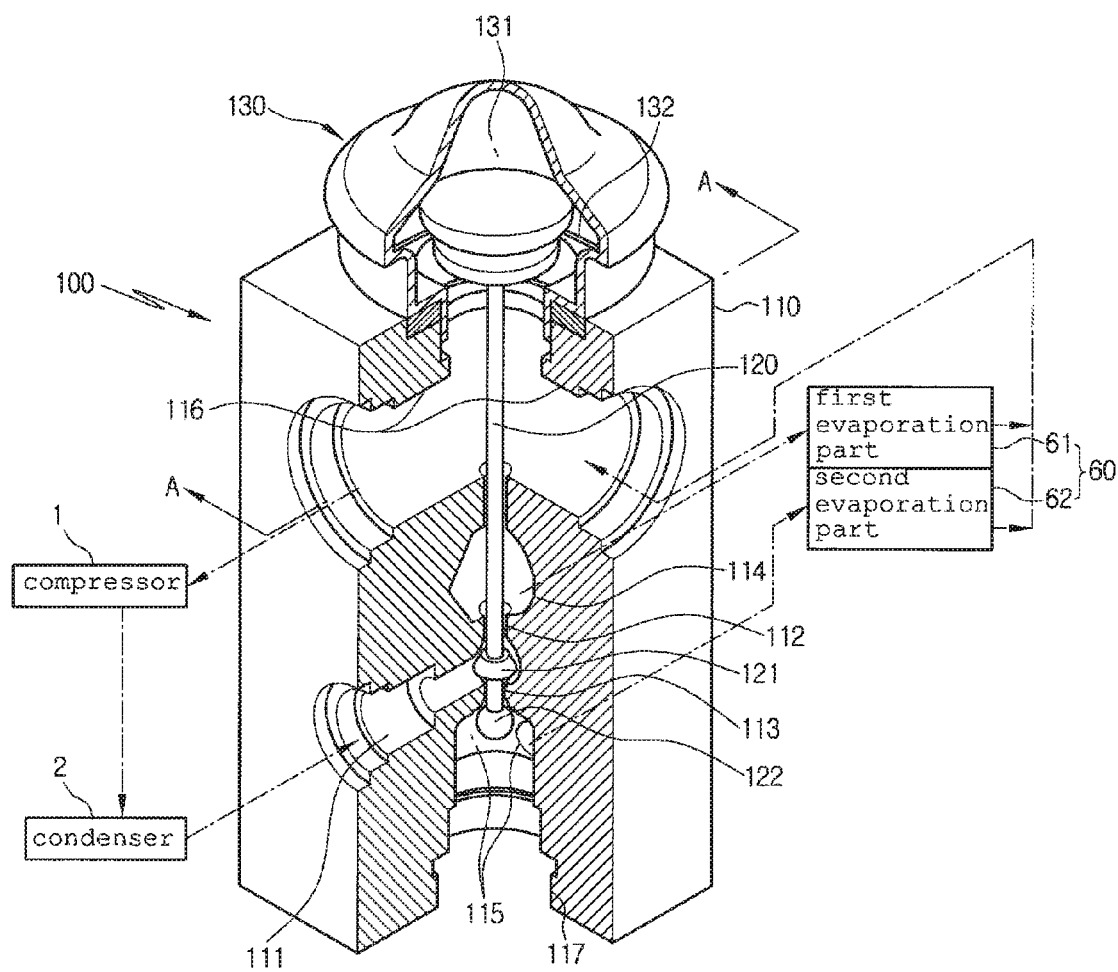
FIG. 7 is a sectional perspective view of the expansion valve.
Figure 8:
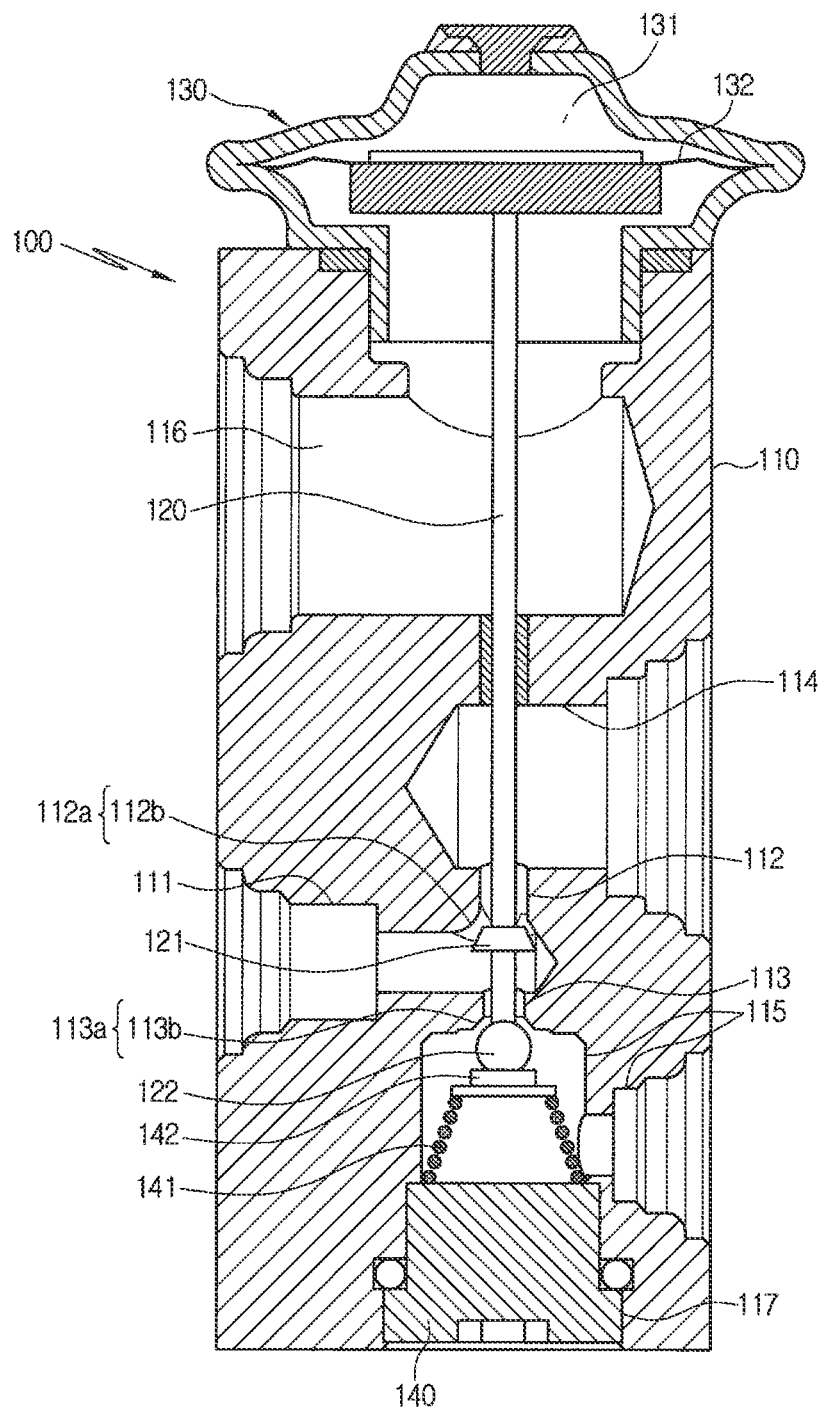
FIG. 8 is a sectional view taken along the line A-A of FIG. 6.

That is, in FIGS. 7 and 8, a diameter of the first discharge channel 114 is larger than that of the second discharge channel 115 in order to supply relatively more refrigerant flow rate to the first evaporation part 61 connected with the first discharge channel 114, but, even though the refrigerant flow rates, which are respectively supplied to the first and second evaporation parts 61 and 62, are different from each other, the first and second discharge channels 114 and 115 may have the same diameter as shown in FIG. 17 in order to enhance productivity.

In this instance, even though the first and second discharge channels 114 and 115 have the same diameter, the refrigerant flow rates can be differently controlled by the first and second valves 121 and 122 and the first and second orifices 112 and 113.

Meanwhile, in the above, the expansion valve 100 has the single inflow channel 111 and two discharge channels 114 and 115, but the present invention is not restricted to the above, and for instance, the expansion valve 100 may have one inflow channel 111 and at least two discharge channels 114 and 115. In this instance, the number of the first and second valves 121 and 122 increases in correspondence to the number of the discharge channels 114 and 115.

Hereinafter, actions of the expansion valve according to the present invention and the air conditioner for vehicles having the same will be described.

First, refrigerant gas of high temperature and high pressure compressed in the compressor 1 is introduced into the condenser 2.

The refrigerant gas introduced into the condenser 2 is condensed through heat-exchange with the outside air and phase-changed into liquid refrigerant of high temperature and high pressure, and then, introduced into the inflow channel 111 of the expansion valve 100.

The refrigerant introduced into the inflow channel 111 is branched to the first and second discharge channels 114 and 115 through the first and second orifices 112 and 113.

In this instance, refrigerant is decompressed and expanded while being branched into the first and second discharge channels 114 and 115 through the first and second orifices 112 and 113.

Moreover, when the shaft 120 moves, the first and second valves 121 and 122 are varied in their positions, and then, the degree of opening of the first and second orifices 112 and 113 is differently controlled. That is, in the present invention, because the first orifice 112 is opened relatively wider than the second orifice 113, refrigerant is branched and supplied into the first orifice 112 more in flow rate than the second orifice 113.

Continuously, the decompressed and expanded refrigerant branched into the first and second discharge channels 114 and 115 through the first and second orifices 112 and 113 becomes in an atomized state of low temperature and low pressure, and then, respectively introduced into the first evaporation part 61 and the second evaporation part 62 of the evaporator 60. In this instance, a relatively more refrigerant flow rate is introduced into the first evaporation part 61.

The refrigerant of low temperature and low pressure introduced into the first evaporation part 61 and the second evaporation part 62 of the evaporator 60 is evaporated by heat-exchange with the air blown to the interior of the vehicle by the blower 160, thereby cooling the air blown to the interior of the vehicle due to the heat absorption effect by latent heat of the refrigerant.

After that, the refrigerant of low temperature and low pressure respectively discharged from the first and second evaporation parts 61 and 62 of the evaporator 60 is joined together, and then, passes through the connection channel 116 of the expansion valve 100. In this instance, the shaft 120 moves by the operating means 130, which is expanded or contracted by temperature or pressure of the refrigerant flowing inside the connection channel 116, to vary the positions of the first and second valves 121 and 122, so that the refrigerant flow rates passing through the first and second orifices 112 and 113 can be controlled by conditions (pressure or temperature) of the evaporator 60 and the refrigerant can effectively cope with the cooling load.

Continuously, the refrigerant passing through the connection channel 116 of the expansion valve 100 is introduced into the compressor 1, and then, is recirculated in the above-mentioned refrigeration cycle.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An expansion valve comprising a main body having an inflow channel receiving refrigerant from a condenser, said refrigerant received by the inflow channel is branched and is directed to a first and a second discharge channels discharging the refrigerant into an evaporator, the evaporator comprising a first evaporation part and a second evaporation part, and first and second orifices, the first orifice fluidly connects the inflow channel and the first discharge channel with each other, and the second orifice fluidly connects the inflow channel and the second discharge channel with each other, said first and second orifice expand the refrigerant branched from the inflow channel to the first discharge channel and the second discharge channel, respectively;

first and second valves mounted inside the main body controlling flow rates of the refrigerant passing through the first and second orifices by controlling the degree of opening of the first and second orifices respectively; and a shaft slidably mounted inside the main body, the first and second valves being fixed on the shaft for varying positions at the same time with the same distance by the movement of the shaft, wherein the first and second orifices are respectively arranged at upper and lower portions of the inflow channel along the axial direction of the shaft, wherein the second discharge channel, the inflow channel, and the first discharge channel are stacked on one another in order and the second discharge channel, the inflow channel and the first discharge channel are apart from one another at a predetermined interval, wherein the first valve is mounted in the inflow channel for opening and closing an inlet side of the first orifice, and the second valve is mounted in the second discharge channel for opening and closing an outlet side of the second orifice, the first and second orifices are opened proportionally or closed at the same time by the movement of the shaft and regulate an expansion rate of refrigerant supplied to the first and second evaporation parts of the evaporator proportionally, wherein a connection passageway for connecting the inflow channel and the second discharge channel with each other is arranged in the main body and a mounting hole is arranged on the lower end portion of the main body in the axial direction of the shaft, the mounting hole is sealed by a sealing member, and the mounting hole communicates with the connection passageway, wherein the second orifice comprises an orifice member detachably joined to the connection passageway, the orifice member comprising a joining body detachably joined to the connection passageway, and the second orifice is arranged on an inner circumferential surface of the joining body, wherein an outer diameter of the joining body of the orifice member is equal to or larger than that of the first valve and a diameter of the second orifice is smaller than outer diameters of the first and second valves, and wherein only the first valve is integral with the shaft, and the second valve is separate from the first valve and is connected to an end portion of the shaft.

2. The expansion valve according to claim 1, wherein the first and second discharge channels have the same diameter.

3. The expansion valve according to claim 1, wherein the first and second valves have different shapes from each other.

4. The expansion valve according to claim 1, wherein the first and second valves have the same shape but different sizes from each other.

5. The expansion valve according to claim 1, wherein the first and second orifices have different diameters from each other.

6. The expansion valve according to claim 1, wherein the first orifice has a first seating face for seating the first valve on the first seating face and the second orifice has a second seating face for seating the second valve on the second seating face the first and the second seating faces have different shapes from each other.

7. The expansion valve according to claim 1, wherein the first orifice has a first seating face for seating the first valve on the first seating face and the second orifice has a second seating face for seating the second valve on the second seating face the first and the second seating faces have the same shape but different sizes from each other.

8. The expansion valve according to claim 1, wherein the first orifice has a first seating face for seating the first valve on the first seating face and the second orifice has a second seating face for seating the second valve on the second seating face, and wherein when the shaft moves a predetermined distance, the first valve is spaced apart from the first seating face of the first orifice at a first distance and the second valve is spaced apart from the second seating face of the second orifice at a second distance, wherein the first distance is different from the second distance thereby the refrigerant passes through the first and second orifices at different flow rates.

* * * * *